Figure 1:
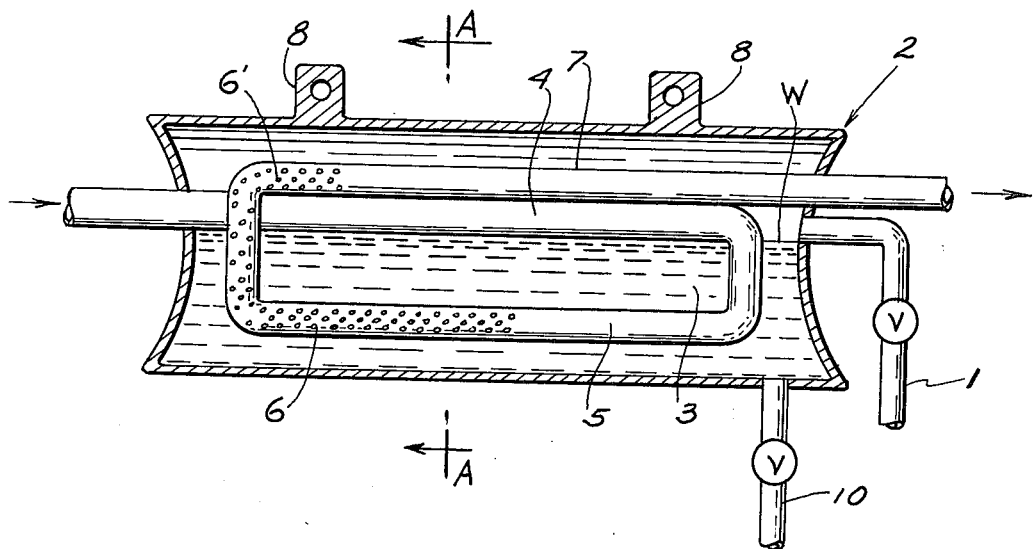

United States Patent [19]
Kim

[11] 3,957,467
[45] May 18, 1976

[54] VEHICULAR POLLUTION CONTROL MUFFLER

[76] Inventor: Seun Kyung Kim, 7226 N. Bell Ave., Chicago, Ill. 60645

[22] Filed: Nov. 19, 1974

[21] Appl. No.: 525,105

[52] U.S. Cl. ............................ 55/256; 55/DIG. 30; 60/310; 261/121 R
[51] Int. Cl.² ....................................... B01D 47/02
[58] Field of Search ............... 55/255, 256, DIG. 30, 55/244; 60/310; 261/121

[56] References Cited
UNITED STATES PATENTS

| | | | |
|---|---|---|---|
| 1,421,432 | 7/1922 | Embanks | 55/256 |
| 3,383,854 | 5/1968 | White | 55/DIG. 30 |
| 3,485,593 | 12/1969 | Lenane et al. | 55/DIG. 30 |

*Primary Examiner*—Bernard Nozick
*Attorney, Agent, or Firm*—Bruce K. Thomas

[57] ABSTRACT

An exhaust gas purifier and silencer for a vehicle is disclosed. More particularly, a new device for the purifying exhaust gases employing a conduit and a container for a gas scrubbing liquid is disclosed in which the conduit passes through the container in a loop having a perforated section, one portion of which is normally below the liquid level and the other portion is above the liquid level.

2 Claims, 2 Drawing Figures

U.S. Patent  May 18, 1976  3,957,467

VEHICULAR POLLUTION CONTROL MUFFLER

It is known in the prior art to purify gases by bubbling the gases through a liquid purifying agent. Intricate bubbling and liquid contact towers are used for this purpose. However, the weirs and bubble caps used depend on the vertical positioning of the tower so that the upflowing gases can meet and pass through the downflowing scrubbing agent. No provision is made for momentarily confining the gases in any one chamber under sound attenuating conditions while dispersing the gas into the scrubbing agent and the recovering the scrubbed gasses by using a conduit having a perforated section above and below liquid level to disperse the gases into the liquid and provide for the exhaust of the scrubbed gases. With this invention, it is possible to produce clean exhaust gas that is free of pullutants and at the same time muffle the sound of the motor from which the gases are produced.

SUMMARY OF THE INVENTION

According to this invention, a muffler is provided having a container for a gas scrubbing solution with means to maintain a predetermined liquid level therein. An exhaust conduit extends into and through the container with a portion of the conduit under the level of liquid and a portion above the level of liquid. The exhaust conduit has a perforated section below the liquid line to allow the escape of gases into the liquid and a perforated section which is above the liquid level to allow the reentry of the scrubbed gases back into the exhaust conduit.

A predetermined amount of scrubbing or purification liquid is maintained in the tank or container and the perforated section or sections of the exhaust pipe are maintained above and below the normal liquid level during the normal function of the vehicle.

Figure 2:
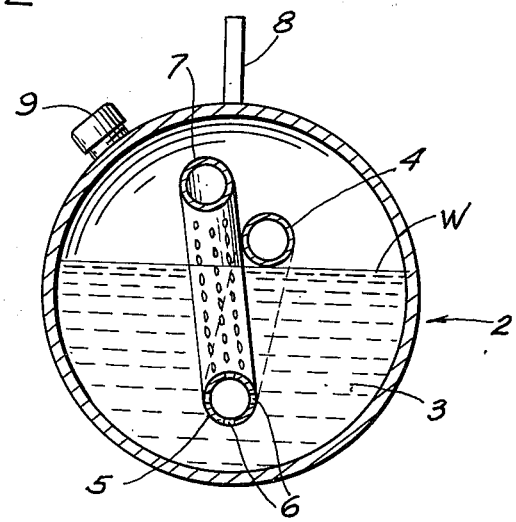

Further explanation of this invention is illustrated in detail as follows, in accordance with the accompanying drawings:

FIG. 1 is a longitudinal cross-sectional view of the device in this invention; and FIG. 2 is the enlarged sectional view taken along the line A—A of FIG. 1.

Referring to the drawings, FIGS. 1 and 2, the device comprises the elongated tubular container 2 designed to hold the gas purifying liquid or solution 3 having the liquid level W. One end wall is provided with the drain pipe 1 with a suitable shutoff valve so that the indicated liquid level W can be readily maintained.

The end walls of the container 2 provide support for the exhaust pipe conducting hot exhaust gases from an internal combustion engine, (not illustrated) as shown having the inlet section 4 that extends through the container at about the longitudinal axis thereof from one end to the other of the container and at about the height of the liquid level W.

The exhaust pipe connects through a downwardly directed riser portion ot the return or injection pipe section 5 which is below the liquid level W and at about the central part of the body of liquid 3 as shown in FIG. 2. A substantial part of the injection pipe section 5 contains the plurality of minute perforations 6 that extend through the side wall of the pipe to allow exhaust gases to flow into the liquid 3. The perforated section 6 can continue along the length of the pipe and include the upwardly directed riser portion at the forward end and also the perforated section 6' which is above the liquid level W during the normal operation of the vehicle. The perforations 6 and 6' can be continuous as shown extending from about the mid portion of the section 5 through the riser portion at the forward end to the return or exhaust section 7. The flow of hot exhaust gases through the muffler 2 is shown by the arrows.

The muffler or container 2 is provided with the cleats 8 for fastening the device to the under part of the vehicle as desired. The filler cap 9 is provided for threaded engagement in a suitable opening in the top wall of the container. This provides the means for opening the container to add additional gas purification liquid 3 as needed. The container 2 is provided with a drain pipe 10 and suitable shut-off valve so that the gas purification liquid can be replaced and any sediment flushed out of the container.

In using the device the plug or cap 9 is removed, the overflow pipe 1 and the drain pipe 10 are closed and the liquid 3 is added until the container is filled over the inlet end of the pipe 1 while the container is in a relatively level position. The overflow pipe 1 can then be opened and the level W of the liquid 3 established. The overflow 1 is then closed and the plug 9 secured in the top wall of the container. The overflow 1 is also used during regular maintenance to check on the liquid level W in the container 2. Alternately, during filling the overflow pipe 1 can be left open and liquid added until it runs out of this pipe.

The gas purification liquid 3 can be any solution or liquid capable of dissolving or reacting with the polluting ingredients in the exhaust gases passing into the device. Illustrative liquids include water, and such solutions as aqueous solutions of anti-freeze agents such as alcohol or ethylene glycol. Aqueous solutions of a detergent, surfactant or wetting agent, dilute solutions of an alkali, such as sodium or potassium hydroxide or alkaline hypochlorite can also be used.

From this description it is seen that the exhaust gases diffuse from the perforations 6 below the liquid level W and the reactable and soluble portions are retained in the solution. The un-reacted and insoluble portions of the exhaust gases accumulate in the zone above the liquid level W, pass through the perforations 6' and proceed out the top pipe section 7. The body of liquid 3 acts to absorb the sound and quiet the exhaust. The passage of the gases through the perforations also attenuates the sound.

The heat of the exhaust gases is gradually absorbed by the liquid 3 and the temperature thereof rises as a result. Since the pipe section 7 is open at one end by the perforations 6' and open at the other end to the atmosphere, the heat absorption does not produce any change in pressure in the container 2.

It is apparent that instead of having the perforated sections 6 and 6' join each other, these parts can be discontinuous, that is, the perforated section 6 can be confined to the bottom straight portion of the pipe section 5, and the perforated section 6' can be provided at any location along the top straight section 7. The pipe section 4 is above the liquid level W so as to normally be empty, thus only that portion of the pipe that is below the liquid level W and without perforations will be initially filled with liquid and cause any back pressure during start-ups. As equilibrium is reached the primary pollutants such as carbon monoxide, sulphur dioxide and the various nitrogen oxides will be removed from the exhaust gases or neutralized and the primary constituents leaving the pipe 7 will be carbon dioxide and water and the level of pollutants therein will be reduced.

It is to be observed that container 2 is formed into an essentially elongated tubular form with its major axis or length extending from the inlet section 4 to the exhaust section 7 and the minor axis, as shown in FIG. 2 is considerably shorter and in this instance circular. Also, the perforations in the intermediate section 5 and the exhaust section 7 are arranged so that a portion of each is maintained below and above, respectively, the liquid level W regardless of the changes that may take place in the fore and aft level of the muffler as the vehicle negotiates a slope or curve the perforated section 6 is under the liquid level W and the perforated section 6' is above the liquid level W.

It is also apparent that if the vehicle is negotiating a hill the inlet end will rise and the liquid level W will assume a position at about a diagonal of the cross-section shown in FIG. 1, yet both the perforated sections 6 and 6' will still remain in the proper relationship with the liquid treating agent 3 and the vapor space above the liquid level W. Similarly with the vehicle going down hill, the exhaust end will be higher and the liquid level W will shift in the opposite direction to the other diagonal of the device as seen in FIG. 1, yet the perforated section 6 is still under the liquid level W and the perforated section 6' is above it. Also, the design shown allows the muffler to be used with its longitudinal axis transverse the frame of the vehicle with the same results of constant relationship of these parts.

What is claimed is:

1. A muffler for exhaust gases from an internal combustion engine comprising:
    an elongated tubular housing member having enclosing end walls;
    a liquid gas-purifying agent contained in said housing;
    an over-flow conduct extending through one of said end walls;
    valve means in said over-flow conduct to maintain said agent at a predetermined liquid level within and longitudenally of said housing;
    an exhaust gas conduct extending through said housng from an inlet end to an outlet end;
    said exhaust gas conduct having inter-connected continous portions including an inlet portion that extends on an axis substantially coincidental with said liquid level, an intermediate portion extending below said liquid level and back toward said other end wall, a substantially vertical riser portion spaced from said other end wall and an exhaust portion extending from said riser portion above said liquid level to said outlet end through one end wall and;
    a plurality of perforations in a section of said intermediate portion nearest said other end wall in said riser portion below said liquid level and a plurality of perforations in a section of said exhaust portion nearest said other end wall above said liquid level;
    whereby, the exhaust gases entering said inlet portion are conducted into said intermediate portions of said conduct and are dispersed through said perforations below said liquid level into said liquid gas-purifying agent for purification thereby and the purified exhaust gases accumulate within said housing above said liquid level for passage through said perforations in said section of said exhaust portion and thence into said outlet of said conduct.

2. A muffler in accordance with claim 1 in which:
    said perforations in said section of said intermediate portion extend from a midpoint between said end walls of said housing in a continuous pattern through said riser portion and into said section of said exhaust portion and said latter perforated section is shorter than the perforated section of said intermediate portion of said conduct.

* * * * *